(12) United States Patent
Coleman et al.

(10) Patent No.: US 11,770,431 B2
(45) Date of Patent: *Sep. 26, 2023

(54) NETWORK-ADAPTIVE LIVE MEDIA ENCODING SYSTEM

(71) Applicant: Amazon Technologies, Inc., Seattle, WA (US)

(72) Inventors: Michael Reddick Coleman, Portland, OR (US); Ryan Hegar, Happy Valley, OR (US); Kevin Moore, Portland, OR (US); Jeffrey Lassahn, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/798,094

(22) Filed: Feb. 21, 2020

(65) Prior Publication Data

US 2020/0195702 A1    Jun. 18, 2020

Related U.S. Application Data

(63) Continuation of application No. 15/197,521, filed on Jun. 29, 2016, now Pat. No. 10,574,717.

(51) Int. Cl.
*H04L 65/70* (2022.01)
*H04L 67/10* (2022.01)
*H04L 65/75* (2022.01)

(52) U.S. Cl.
CPC ............ *H04L 65/70* (2022.05); *H04L 65/762* (2022.05); *H04L 67/10* (2013.01)

(58) Field of Classification Search
CPC ...... H04L 65/607; H04L 67/10; H04L 65/602; H04L 65/80
See application file for complete search history.

(56) References Cited

U.S. PATENT DOCUMENTS

| | | | |
|---|---|---|---|
| 9,462,435 B2 * | 10/2016 | Anisimov | ............... H04L 51/04 |
| 9,716,916 B2 * | 7/2017 | Major | ............... H04N 21/8456 |
| 9,953,037 B1 * | 4/2018 | Cowburn | ............... G06F 16/95 |
| 2001/0044851 A1 * | 11/2001 | Rothman | ........... H04N 7/17336 |
| | | | 709/231 |
| 2002/0091969 A1 | 7/2002 | Chen et al. | |
| 2003/0236912 A1 * | 12/2003 | Klemets | ............. H04L 65/1043 |
| | | | 709/236 |
| 2006/0039290 A1 | 2/2006 | Roden et al. | |
| 2007/0291693 A1 | 12/2007 | Schultz et al. | |

(Continued)

*Primary Examiner* — Michael A Keller
(74) *Attorney, Agent, or Firm* — Knobbe Martens Olson & Bear LLP

(57) ABSTRACT

A contribution encoder receives media from a source, encodes the media, and transmits the encoded media to a network-adaptive encoding system for eventual distribution to end users. The network-adaptive encoding system tests a network connection between the contribution encoder and the network-adaptive encoding system before transmission of the encoded media begins. The network-adaptive encoding system uses the results of the test to select appropriate values for parameters that define the encoding and transmission of the media. The selected parameter values are transmitted by the network-adaptive encoding system to the contribution encoder for use in encoding and transmitting the media.

19 Claims, 6 Drawing Sheets

(56) References Cited

U.S. PATENT DOCUMENTS

| | | | |
|---|---|---|---|
| 2008/0059580 A1* | 3/2008 | Kalinowski | G06Q 10/107 709/204 |
| 2009/0172763 A1* | 7/2009 | Liu | H04N 21/8106 725/114 |
| 2010/0122305 A1 | 5/2010 | Moloney | |
| 2010/0318671 A1* | 12/2010 | Lee | H04L 65/4092 709/231 |
| 2011/0134763 A1 | 6/2011 | Medina et al. | |
| 2012/0062794 A1* | 3/2012 | Hallmarker | H04N 21/8547 348/521 |
| 2012/0129547 A1* | 5/2012 | Andrews, III | G06T 1/0021 455/456.1 |
| 2012/0317300 A1* | 12/2012 | Huang | H04L 65/613 709/231 |
| 2013/0195168 A1* | 8/2013 | Singh | H04N 21/23439 375/240.02 |
| 2014/0119456 A1* | 5/2014 | Bivolarsky | H04N 19/33 375/240.25 |
| 2014/0298193 A1* | 10/2014 | Kiss | G06F 9/451 715/744 |
| 2014/0351383 A1* | 11/2014 | Wan | G16H 20/10 709/219 |
| 2015/0172848 A1* | 6/2015 | Gao | H04W 52/0229 455/41.3 |
| 2015/0312601 A1* | 10/2015 | Novotny | H04N 21/23655 725/117 |
| 2016/0191483 A1 | 6/2016 | Larson et al. | |
| 2016/0323145 A1* | 11/2016 | Anderson | H04L 67/1031 |
| 2016/0332081 A1* | 11/2016 | Marr | A63F 13/63 |
| 2017/0019326 A1 | 1/2017 | Patel | |
| 2017/0078159 A1* | 3/2017 | Bae | H04N 17/004 |
| 2017/0104647 A1* | 4/2017 | Chaiyochlarb | H04L 65/1069 |
| 2017/0257337 A1* | 9/2017 | Hampson | H04L 51/24 |
| 2017/0264604 A1* | 9/2017 | Drako | H04L 63/083 |
| 2017/0288894 A1* | 10/2017 | Marino | H04L 12/2809 |
| 2017/0312626 A1* | 11/2017 | Colenbrander | A63F 13/48 |
| 2017/0332117 A1* | 11/2017 | Haritaoglu | H04N 21/23439 |
| 2017/0347135 A1* | 11/2017 | Frantz | H04N 21/44004 |

* cited by examiner

NETWORK-ADAPTIVE LIVE MEDIA ENCODING SYSTEM

CROSS REFERENCE TO RELATED APPLICATIONS

This application is a continuation of U.S. patent application Ser. No. 15/197,521, entitled "NETWORK-ADAPTIVE LIVE MEDIA ENCODING SYSTEM" and filed on Jun. 29, 2016, the entire disclosure of which is hereby incorporated by reference herein.

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

Service providers or content creators (such as businesses, artists, media distribution services, etc.) can employ interconnected computing devices (e.g., within data centers) to deliver content to users or clients. In some instances, these computing devices may support traditional content distribution systems, such as by creating, modifying, or distributing streaming television or radio content. In other instances, these computing devices may serve to replicate or replace prior content distribution systems. For example, data centers can provide network-based streaming audio or video content in a manner similar to traditional television or radio networks. This content is sometimes referred to as "internet television" or "internet radio," respectively. The content provided by these distribution systems (e.g., both traditional and computing network-based) may be pre-recorded, or live. Often, where computing devices are used to facilitate either traditional or network-based distribution systems, specialized software is used to replace or replicate functionality of dedicated hardware devices. For example, software applications may be used to encode and package a data stream containing live video content, thus reducing or eliminating the need for dedicated hardware to perform these functions. Because of the flexibility of software-based solutions, a single computing device may be utilized to generate content for both traditional and network-based generation systems.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
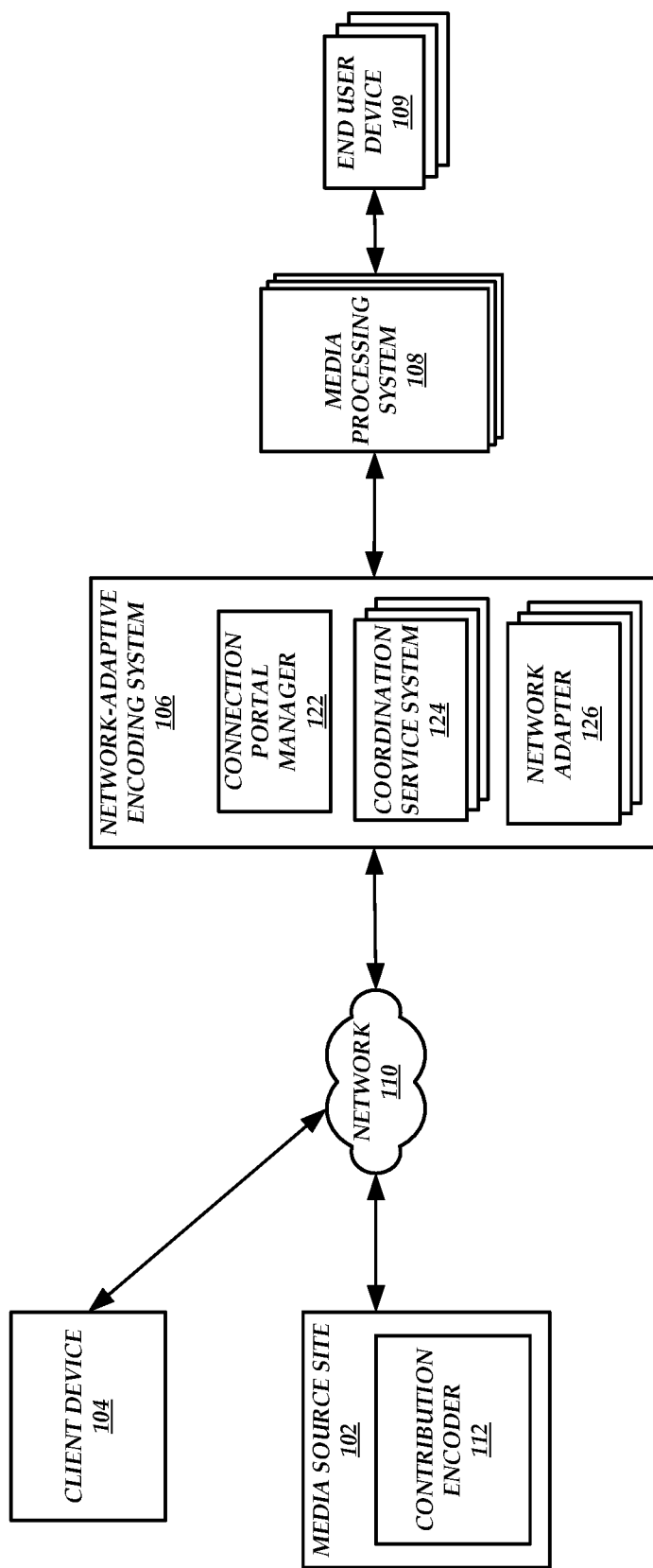
FIG. 1 is a block diagram of a network-adaptive live media encoding environment that includes a media source site, a client device, a network-adaptive encoding system, a media processing system, and end user devices, according to one embodiment.

Generally, an entity transmitting streaming data is required to set the parameters for transmitting the live stream to a central server. For example, the entity can operate an encoder in which parameters, such as the codec, bitrate, image dimension, chroma subsampling, group of pictures (GOP) length, GOP structure, scan type, transport type, audio sampling rate, video frame rate, or forward error correction type, are set. Acceptable values for many of the parameters are dependent on the characteristics of the network connection between the encoder and the central server. Such network connection characteristics can include the type of packet loss (e.g., random, bursty, etc.), the available network bandwidth, whether any firewalls or network address translation (NAT) boxes are blocking network ports or two-way transmissions, whether data transmitted using a first protocol is throttled as compared to data transmitted using a second protocol, network latency, or the like. Setting incorrect or suboptimal values for some or all of the parameters can cause a sub-optimal end user experience. For example, if the bitrate is set higher than the maximum bitrate allowed given the characteristics of the network connection, then the transmission can experience a high packet loss rate. Conversely, if the bitrate is set too low, then the quality of the stream may be lower than what was possible given the characteristics of the network connection.

However, it is difficult for entities to select appropriate values for the parameters because entities often are unaware of the characteristics of the network connection. For example, live events are generally broadcast from unfamiliar, foreign, or remote locations (e.g., stadiums, breaking news sites, etc.) in which network connection characteristics are unknown or unavailable. In addition, communications between the encoder and the central server in conventional systems are one-way communications, and thus the central server does not provide the entity with any information of the characteristics of the network connection. Even if, by chance, the entity initially happens to select appropriate values for the parameters, network conditions can change during transmission of the live stream and the selected values may not be appropriate for the duration of the transmission.

Generally described, various embodiments disclosed herein provide a network-adaptive encoding system that automatically determines and transmits appropriate parameters to the encoder based on a test of the network connection between the network-adaptive encoding system and the encoder. Illustratively, the network-adaptive encoding system can include a connection portal manager, one or more coordination service systems, and one or more network adapters. An entity can set up a live stream via a portal provided by the connection portal manager. As part of the setup, the entity can provide details on how the live stream will be distributed to end users and which encoder (referred to herein as a contribution encoder) will be used to transmit the live stream. Once the contribution encoder is initialized, the contribution encoder communicates with a coordination service system indicating an intention to transmit a live stream.

The coordination service system can retrieve the setup information from the connection portal manager and assign a network adapter to the contribution encoder. Network adapters may be located in different geographic regions, and thus the assigned network adapter can be located in the same geographic region as the contribution encoder. The coordination service system can then instruct the network adapter to test a network connection between the contribution encoder and the network adapter. For example, the network adapter can measure the network speed (e.g., bitrate), network latency, packet jitter, or other signal processing parameters.

Results of the network connection test are sent to the coordination service system and the coordination service system uses the results or optimal parameter values received from a media processing system to generate the parameter values. For example, the coordination service system can include a rules engine that maps measured network characteristics or optimal parameter values to specific parameter values. Once the parameter values are generated, the coordination service system transmits the parameter values to the contribution encoder. The contribution encoder can then begin transmitting the live stream to the network adapter using the received parameter values.

As described above, network conditions can change during the transmission of the live stream. Thus, the coordination service system instructs the network adapter to periodically measure the network connection characteristics and provide such characteristics to the coordination service system. If the network conditions dictate that the contribution encoder settings should be updated, then the coordination service system can generate updated parameter values and transmit the updated parameter values to the contribution encoder. Additional details and embodiments of the network-adaptive encoding system are described below with respect to FIGS. 1-5.

Example Network-Adaptive Live Media Encoding Environment

FIG. 1 is a block diagram of a network-adaptive live media encoding environment that includes a media source site 102, a client device 104, a network-adaptive encoding system 106, media processing systems 108, and end user devices 109, according to one embodiment. As illustrated in FIG. 1, the media source site 102 includes a contribution encoder 112 and the network-adaptive encoding system 106 includes a connection portal manager 122, one or more coordination service systems 124, and one or more network adapters 126.

The media source site 102 is a physical location at which an event is occurring. For example, the media source site 102 can be the site of a news story, a stadium, an arena, or the like. At the media source site 102, an entity can use a contribution encoder 112 to transmit a live stream to the network adapter 126. A live stream can include one or more data packets that include encoded media (e.g., video, audio, audio and video, etc.). In an embodiment, the contribution encoder 112 is a computing device that receives media from a source (e.g., a camera, a microphone, etc.) and encodes the media for transmission over network 110. A single contribution encoder 112 can receive media from one or more sources. A single contribution encoder 112 can also transmit the encoded media to one or more network adapter 126.

An entity can manually set values for parameters for encoding the media. Alternatively, parameter values can be received automatically from the coordination service system 124, as described in greater detail below. The parameters can include the codec (e.g., audio codec, video codec, etc.), bitrate (e.g., audio bitrate, video bitrate, etc.), image dimension, chroma subsampling, GOP length, GOP structure, scan type (e.g., progressive, interlaced, etc.), transport type (e.g., user datagram protocol (UDP), transmission control protocol (TCP), etc.), audio sampling rate, video frame rate, forward error correction (FEC) type (e.g., automatic repeat request (ARQ), RAPTORQ™, etc.), or the like.

The client device 104 is a computing device (e.g., desktop, laptop, mobile device, etc.) configured to access the connection portal manager 122 via the network 110. In an embodiment, the connection portal manager 122 generates a portal (e.g., a user interface) in which a live stream can be set up. For example, an entity can use the client device 104 to access the portal to set up a live stream. During the setup, the entity can provide details on how the live stream will be distributed to end users (e.g., duration of the live stream, bitrates available to end users, which devices can access the live stream, etc.) and which contribution encoder will be used to transmit the live stream (e.g., the contribution encoder 112). The client device 104 can be physically located separately from the media source site 102. For example, the client device 104 can be located at an entity's office whereas the media source site 102 can be located remote from the entity's office (e.g., a location at which an event is occurring).

The coordination service system 124 is configured to manage the transmission of the live stream from the contribution encoder 112 to the network adapter 126. For example, upon receiving an indication from the contribution encoder 112 of an intention to transmit a live stream, the coordination service system 124 indicates to the media processing system 108 that a live stream of encoded media will be transmitted to the media processing system 108 in the future. The media processing system 108 then determines optimal parameter values associated with an optimal transmission of the encoded media and sends the determined optimal parameter values to the coordination service system 124. For example, the encoded media may be provided to users via the end user devices 109 at a specified distribution quality level. As described below, the media processing system 108 transcodes received encoded media for distribution to the end user devices 109, which can degrade the quality of the received encoded media. Thus, the media processing system 108 can determine optimal parameter values such that the received encoded media is at a quality level that is high enough above the specified distribution quality level to account for any quality degradation that may occur from the transcoding operation (e.g., degrading the quality of the received encoded media via transcoding would not drop the quality level below the specified distribution quality level).

Upon receiving an indication from the contribution encoder 112 of an intention to transmit a live stream, the coordination service system 124 also assigns a network adapter (e.g., the network adapter 126) to the contribution encoder 112. In an embodiment, the assigned network adapter is selected based on a geographic region of the network adapter and a geographic region of the contribution encoder 112. The network-adaptive encoding system 106 may include a plurality of network adapters 126, with one or more physically located in different geographic regions. Because some transport protocols (e.g., TCP) are more reliable when the distance between a transmitter and a receiver is short, it may be beneficial to assign a network adapter 126 to the contribution encoder 112 that is in the same geographic region as the contribution encoder 112. In an alternate embodiment, the assigned network adapter is selected based on dynamic routing information. For example, a traceroute or similar command can be run on the contribution encoder 112 and the results of the traceroute, along with direct measurements from different network adapters 126 (e.g., network conditions measured by the different network adapters 126) can be used to select an appropriate network adapter 126. Thus, the network adapter 126 assigned to the contribution encoder 112 can be in a different geographic region than the contribution encoder 112.

After assigning the network adapter 126 to the contribution encoder 112, the coordination service system 124 instructs the network adapter 126 to test a network connection between the contribution encoder 112 and the network adapter 126. The test can include the network adapter 126 and the contribution encoder 112 transmitting test packets to one another. During the test, the network adapter 126 measures characteristics of the network connection, including the type of packet loss (e.g., random, bursty, etc.), the available network bandwidth, whether any firewalls or NAT boxes are blocking network ports or two-way transmissions, whether data transmitted using a first protocol is throttled as compared to data transmitted using a second protocol, network latency, or the like. The network adapter 126 can transmit these measurements to the coordination service system 124.

The coordination service system 124 can use the received measurements and/or the optimal parameter values determined by the media processing system 108 to generate parameter values for encoding the media. For example, the coordination service system 124 can include a rules engine that includes a mapping of measurement values and/or optimal parameter values to parameter values for encoding the media. Once the parameter values are generated, the coordination service system 124 transmits the parameter values to the contribution encoder 112. For example, the transmission of the parameter values to the contribution encoder 112 can be implemented using a hypertext transfer protocol (HTTP) two-way handshake.

As described above, the contribution encoder 112 uses the received parameter values to encode and transmit the media to the assigned network adapter 126. During transmission of the media, network conditions can change. Thus, the network adapter 126 continuously monitors network conditions during the transmission. For example, the network adapter 126 can run periodic tests to measure updated characteristics of the network connection in the same manner as described above. As another example, the network adapter 126 can measure updated characteristics of the network connection based on the encoded media received from the contribution encoder 112. The coordination service system 124 periodically queries the network adapter 126 to retrieve the most-recent updated characteristics. The coordination service system 124 can then determine whether the parameter values need to be updated based on the rules engine, the updated characteristics, or the optimal parameter values. If the updated characteristics dictate that one or more parameter values should be updated, then the coordination service system 124 generates updated parameter values and transmits the updated parameter values to the contribution encoder 112. Once the updated parameter values are received, the contribution encoder 112 updates the encoding of the media accordingly.

The assigned network adapter 126 forwards the encoded media to the media processing system 108. The media processing system 108 can include one or more computing devices that transcode the encoded media into one or more encoded streams at different bitrates. The media processing system 108 hosts the one or more encoded streams, which can be accessed by end users via the end user devices 109.

In a further embodiment, the coordination service system 124 assigns two or more network adapters 126 to the contribution encoder 112 and the contribution encoder 112 forwards the encoded media to each network adapter 126. For example, the entity may wish to distribute the live stream to different geographic regions (and can indicate this during the setup). As another example, a second network adapter 126 can function as a backup network adapter to be used to forward encoded media to the media processing system 108 if a primary network adapter fails (and the entity can indicate this during the setup).

Because transmitting encoded media to two or more network adapters 126 can reduce the amount of bandwidth available to any one network adapter 126, a first network adapter 126 can run the network connection test and the coordination service system 124 can generate the parameter values assuming that the assigned network adapters 126 will each share the measured characteristics. Alternatively, each network adapter 126 can independently run a network connection test. Based on the results of the tests, the coordination service system 124 can generate appropriate parameter values. The parameter values can be the same for each transmission or the parameter values can be unique to a particular transmission. For example, if one network adapter 126 is a backup network adapter, then the parameter values may be set such that the connection with the primary network adapter 126 uses a higher percentage of the available network resources (e.g., 80%) than the connection with the backup network adapter (e.g., 20%).

The media source site 102 can also include multiple contribution encoders 112. For example, each contribution encoder 112 may receive media from a different source (e.g., different camera angles or views captured from various locations at the same event, media captured from cameras located at different events, etc.). Alternatively, each contribution encoder 112 can receive media from the same source. The contribution encoders 112 can transmit the encoded stream to the same network adapter 126 or different network adapters 126.

In some embodiments, a single contribution encoder 112 receives media from multiple sources or from a source and one or more other contribution encoders 112. The single contribution encoder 112 can statmux the received media (e.g., combine the data received from each source, or numerous sources, such that each data packet of the transmitted encoded media includes data corresponding to media from each of the sources) and transmit the statmuxed media as a single stream of data. Thus, instead of transmitting media in multiple transmissions from a single media source site 102, which can cause packet loss due to collisions, media from different sources can be transmitted in a single transmission (or multiple transmissions if transmitted to multiple network adapters 126). The parameter values generated by the coordination service system 124 can then apply to the statmuxed media stream rather than individual media streams. In addition, the coordination service system 124 can generate a value for an extra parameter referred to as the overall statmux bitrate. The overall statmux bitrate indicates to the contribution encoder 112 the target sum of the bitrates of the transcoded media from the multiple sources. This may reduce the amount of processing performed by the coordination service system 124 because the coordination service system 124 would not have to take into account the possibility of multiple transmissions occupying the same bandwidth. Statmuxing the received media can provide additional benefits, including allowing the optimization of media quality of a group of encoded media over a constrained bitrate based on content, allowing different bitrate allocation policies per individual media stream, or the like. The media processing system 108 can demultiplex the statmuxed media stream before distribution to end users.

The network-adaptive encoding system 106 and the media processing systems 108 may each include one or more processors, memory that stores instructions executed by the one or more processors, network interfaces, application-specific hardware, or other hardware components that allow the systems to perform the functionality described herein.

While a single network-adaptive encoding system 106 is illustrated in FIG. 1, this is not meant to be limiting. The network-adaptive live media encoding environment may include any number of network-adaptive encoding systems, where the multiple network-adaptive encoding systems can be accessed via the network 110. The network 110 may be a publicly accessible network of linked networks, possibly operated by various distinct parties, such as the Internet. In other embodiments, the network 110 may include a private network, personal area network, local area network, wide area network, cable network, satellite network, cellular telephone network, etc. or combination thereof, each with access to or from the Internet.

It will be appreciated that the example of FIG. 1 has been simplified for the purposes of explanation, and that the number and organization of components in the network-adaptive encoding system 106 may be much larger or smaller than what is depicted in FIG. 1. For example, as one illustrative embodiment, multiple connection portal managers 122 may be included in the network-adaptive encoding system 106, where each corresponds with a different entity or group of entities. As another example, as one illustrative embodiment, the functionality of the coordination service system 124 and the network adapter 126 can be combined and performed by a single computing device.

The client device 104 and the end user devices 109 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances.

Figure 2A:
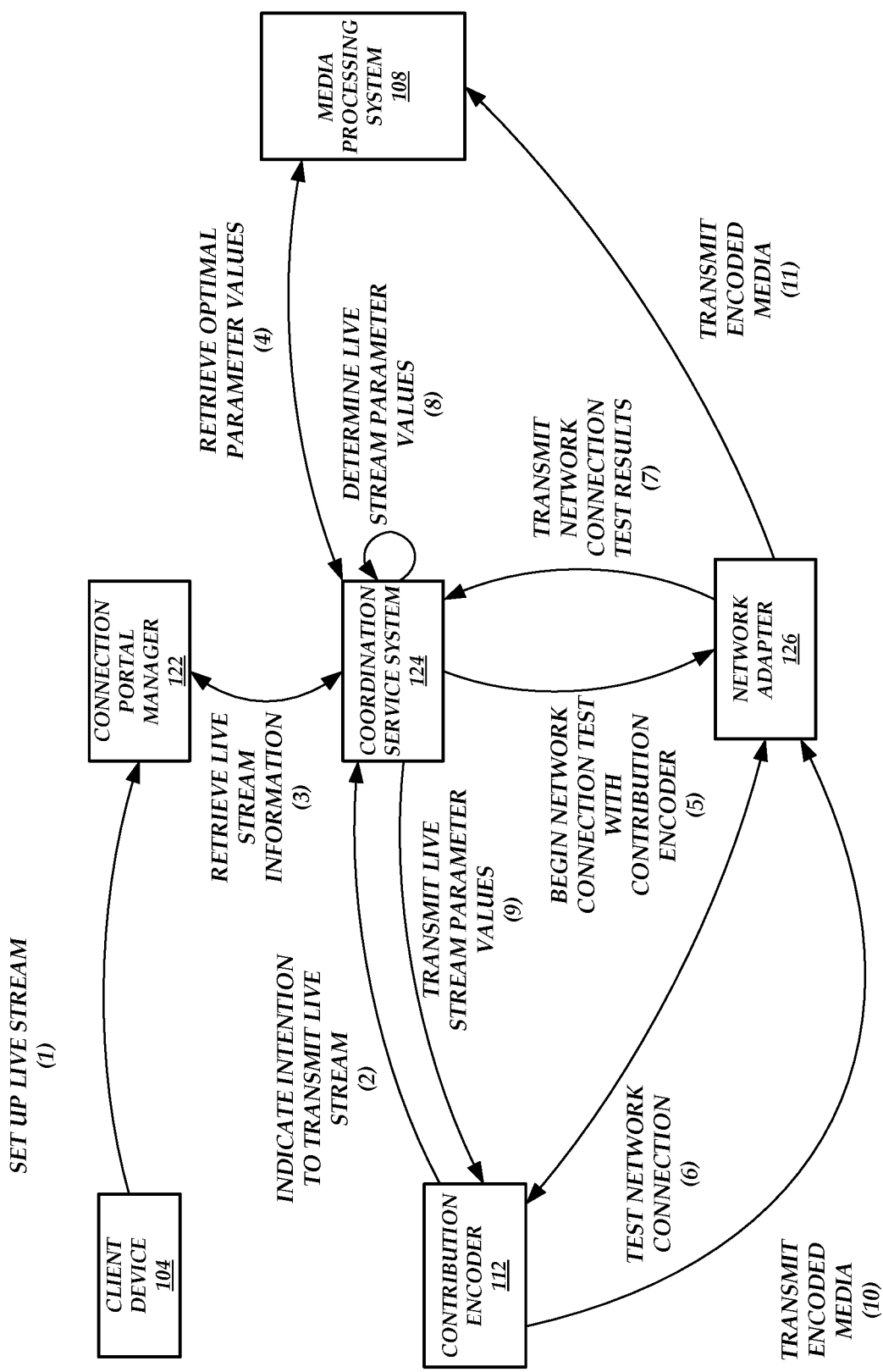
FIG. 2A is a block diagram of the network-adaptive live media encoding environment of FIG. 1 illustrating the operations performed by the components of the network-adaptive live media encoding environment to automatically set the parameters of the contribution encoder 112, according to one embodiment.

FIG. 2A is a block diagram of the network-adaptive live media encoding environment of FIG. 1 illustrating the operations performed by the components of the network-adaptive live media encoding environment to automatically set the parameters of the contribution encoder 112, according to one embodiment. As illustrated in FIG. 2A, the client device sets up a live stream at (1) via a portal generated by the connection portal manager 122.

The contribution encoder 112 can then transmit an indication of an intention to transmit a live stream at (2) to the coordination service system 124. The contribution encoder 112 may receive information on which coordination service system 124 to contact from the client device 104 (e.g., the connection portal manager 122 may provide such information via the portal), the connection portal manager 122, or the coordination service system 124 itself. Upon receiving the indication, the coordination service system 124 can retrieve live stream information at (3) from the coordination service system 124. For example, the live stream information can include the information provided by the client device 104 to set up the live stream.

The coordination service system 124 retrieves optimal parameter values from the media processing system 108 at (4). For example, the coordination service system 124 can inform the media processing system 108 that encoded media will be transmitted to the media processing system 108 shortly. The media processing system 108 can then determine optimal parameter values for encoding the media and provide the optimal parameter values to the coordination service system 124 for use in eventually determining live stream parameter values. The optimal parameter values may be determined such that any degradation caused by the media processing system 108 in transcoding the encoded media would not result in the quality of the transcoded encoded media falling below a desired distribution quality level.

Before or after retrieving optimal parameter values from the media processing system 108, the coordination service system 124 assigns a network adapter 126 to the contribution encoder 112 and instructs the network adapter 126 to begin a network connection test with the contribution encoder 112 at (5). The network adapter 126 tests the network connection at (6) and transmits the network connection test results at (7) to the coordination service system 124.

Using the network connection test results or the optimal parameter values, the coordination service system 124 determines appropriate live stream parameter values at (8). These parameter values are then transmitted at (9) to the contribution encoder 112.

The contribution encoder 112 uses the parameter values to encode media. The contribution encoder 112 then transmits the encoded media at (10) to the assigned network adapter 126. The assigned network adapter 126 then forwards the encoded media at (11) to the media processing system 108 for distribution to end users.

Figure 2B:
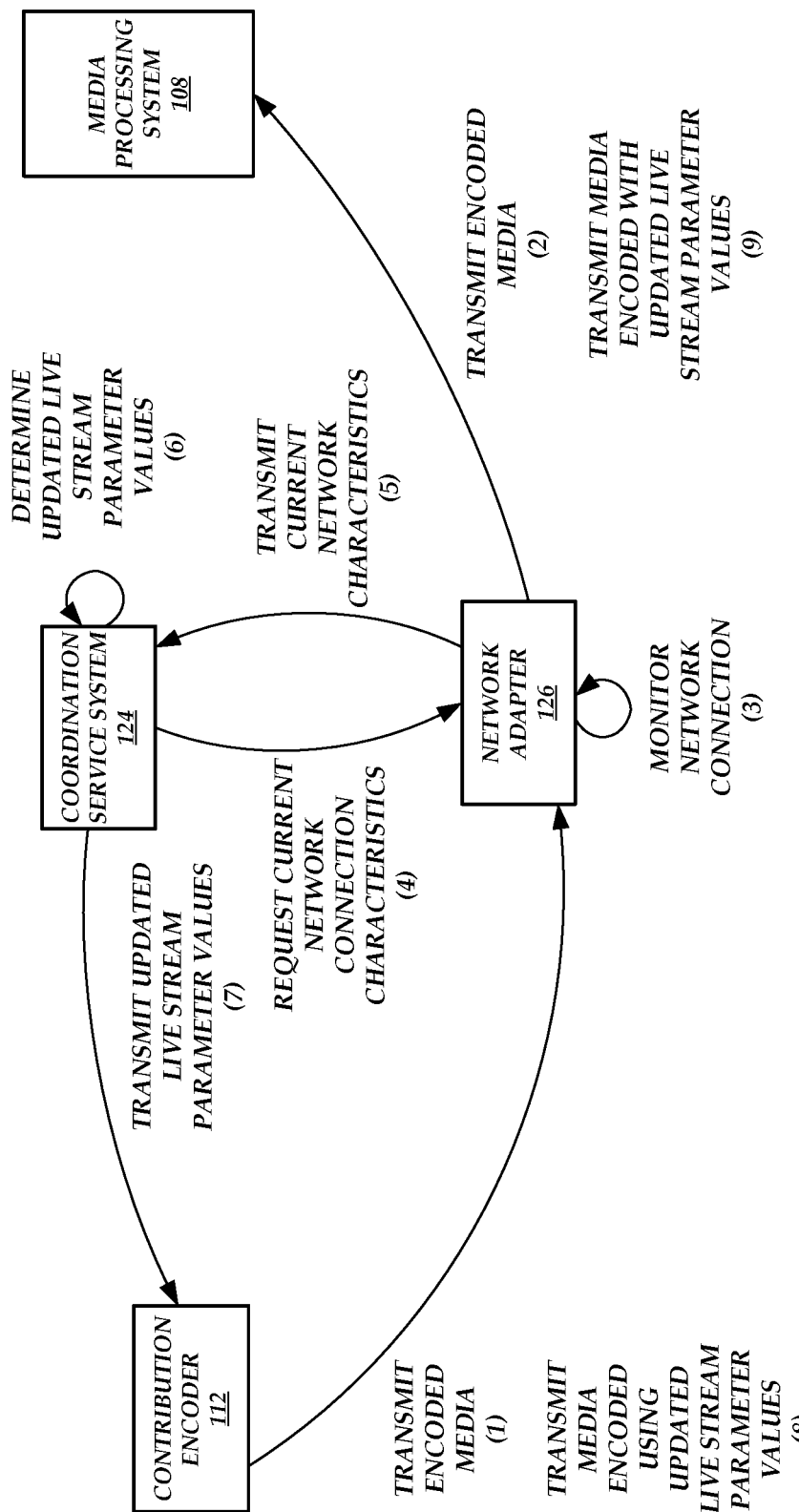
FIG. 2B is a block diagram of the network-adaptive live media encoding environment of FIG. 1 illustrating the operations performed by the components of the network-adaptive live media encoding environment to update parameters of the contribution encoder, according to one embodiment

FIG. 2B is a block diagram of the network-adaptive live media encoding environment of FIG. 1 illustrating the operations performed by the components of the network-adaptive live media encoding environment to update parameters of the contribution encoder 112, according to one embodiment. As illustrated in FIG. 2B, the coordination service system 124 has already transmitted initial parameter values to the contribution encoder 112 and the contribution encoder 112 transmits the encoded media at (1) to the network adapter 126, which forwards the encoded media at (2) to the media processing system 108.

During transmission of the encoded stream, the network adapter 126 monitors the network connection at (3). As part of the monitoring, the network adapter 126 measures updated characteristics of the network connection. For example, the network adapter 126 can measure updated characteristics based on the encoded media transmitted by the contribution encoder 112. As another example, the network adapter 126 can measure updated characteristics based on data packets other than the encoded media transmitted by the network adapter 126 to the contribution encoder 112 and/or transmitted by the contribution encoder 112 to the network adapter 126. Periodically, the coordination service system 124 requests current network connection characteristics at (4) from the network adapter 126. The network adapter 126 may then transmit the current or most-recent measured network connection characteristics at (5) to the coordination service system 124.

Based on the current measured network connection characteristics, the coordination service system 124 determines whether the current characteristics indicate that the parameter values should be updated. The coordination service system 124 can make the determination whether the parameter values should be updated by also taking into account the optimal parameter values previously received from the media processing system 108. If this is the case, the coordination service system 124 determines updated parameter values at (6) and transmits the updated parameter values at (7) to the contribution encoder 112.

The contribution encoder 112 then begins to encode media using the updated parameter values and transmits the media encoded using the updated parameter values at (8) to the assigned network adapter 126. The assigned network adapter 126 then forwards the media encoded using the updated parameter values at (9) to the media processing system 108 for distribution to end users.

Figure 3:
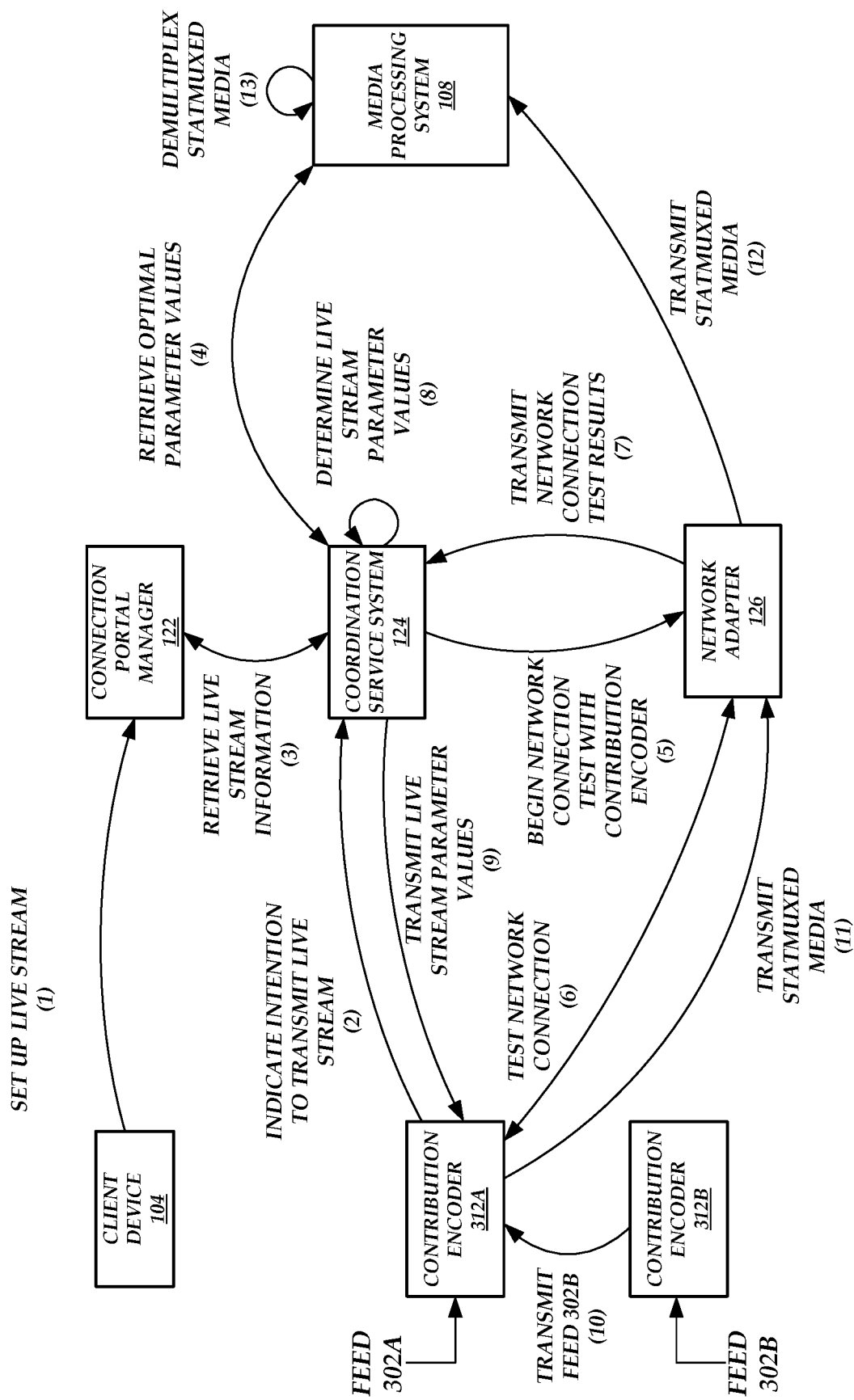
FIG. 3 is a block diagram of the network-adaptive live media encoding environment of FIG. 1 illustrating the operations performed by the components of the network-adaptive live media encoding environment to automatically set the parameters of a contribution encoder 312A when the contribution encoder 312A transmits encoded statmuxed media, according to one embodiment.

FIG. 3 is a block diagram of the network-adaptive live media encoding environment of FIG. 1 illustrating the operations performed by the components of the network-adaptive live media encoding environment to automatically set the parameters of a contribution encoder 312A when the contribution encoder 312A transmits encoded statmuxed media, according to one embodiment. As illustrated in FIG. 3, the client device sets up a live stream at (1) via a portal generated by the connection portal manager 122.

The contribution encoder 112 can then transmit an indication of an intention to transmit a live stream at (2) to the coordination service system 124. The contribution encoder 112 may receive information on which coordination service system 124 to contact from the client device 104 (e.g., the connection portal manager 122 may provide such information via the portal), the connection portal manager 122, or the coordination service system 124 itself. Upon receiving the indication, the coordination service system 124 can retrieve live stream information at (3) from the coordination service system 124. For example, the live stream information can include the information provided by the client device 104 to set up the live stream.

The coordination service system 124 retrieves optimal parameter values from the media processing system 108 at (4). For example, the coordination service system 124 can inform the media processing system 108 that encoded media will be transmitted to the media processing system 108 shortly. The media processing system 108 can then determine optimal parameter values for encoding the media and provide the optimal parameter values to the coordination service system 124 for use in eventually determining live stream parameter values. The optimal parameter values may be determined such that any degradation caused by the media processing system 108 in transcoding the encoded media would not result in the quality of the transcoded encoded media falling below a desired distribution quality level.

Before or after retrieving optimal parameter values from the media processing system 108, the coordination service system 124 assigns a network adapter 126 to the contribution encoder 112 and instructs the network adapter 126 to begin a network connection test with the contribution encoder 112 at (5). The network adapter 126 tests the network connection at (6) and transmits the network connection test results at (7) to the coordination service system 124.

Using the network connection test results and/or the optimal parameter values, the coordination service system 124 determines appropriate live stream parameter values at (8). These parameter values are then transmitted at (9) to the contribution encoder 112.

As described above, a contribution encoder can transmit statmuxed media. Media can be received from different sources or from different sources and other contribution encoders. Illustratively, the contribution encoder 312A and the contribution encoder 312B are present. The contribution encoder 312A receives a feed 302A from a first source and the contribution encoder 312B receives a feed 302B from a second source. Alternatively, the contribution encoder 312A or 312B could receive multiple feeds from multiple sources. Here, the contribution encoder 312A is assigned as the contribution encoder that communicates with the network adapter 126. Thus, the network adapter 126 runs a network connection test by communicating with the contribution encoder 312A and not the contribution encoder 312B. However, in other embodiments, not shown, the network adapter 126 can run network connection tests by communicating with both contribution encoders 312A and 312B.

Because the contribution encoder 312A transmits the statmuxed media to the network adapter 126, the contribution encoder 312B forwards the feed 302B to the contribution encoder 312A at (10). The contribution encoder 312B can encode the feed 302B before transmission or can transmit the raw feed 302B.

The contribution encoder 312A statmuxes the feed 302A and the feed 302B into a single media stream and encodes the single media stream using the received parameter values. In an embodiment, the received parameter values may include a value for an extra live stream parameter referred to as the overall statmux bitrate. The overall statmux bitrate can be the sum of the bitrates of one or more feeds 302A-B included within the single media stream. The coordination service system 124 may be notified beforehand that the contribution encoder 312A will transmit statmuxed encoded media (e.g., via the live stream information) and thus can determine a value for the overall statmux bitrate based on the results of the network connection test or the optimal parameter values received from the media processing system 108.

The contribution encoder 312A then transmits the statmuxed encoded media at (11) to the assigned network adapter 126. The assigned network adapter 126 then forwards the statmuxed encoded media at (12) to the media processing system 108. The media processing system 108 demultiplexes the statmuxed encoded media at (13) before the encoded media is available for distribution to end users.

Figure 4:
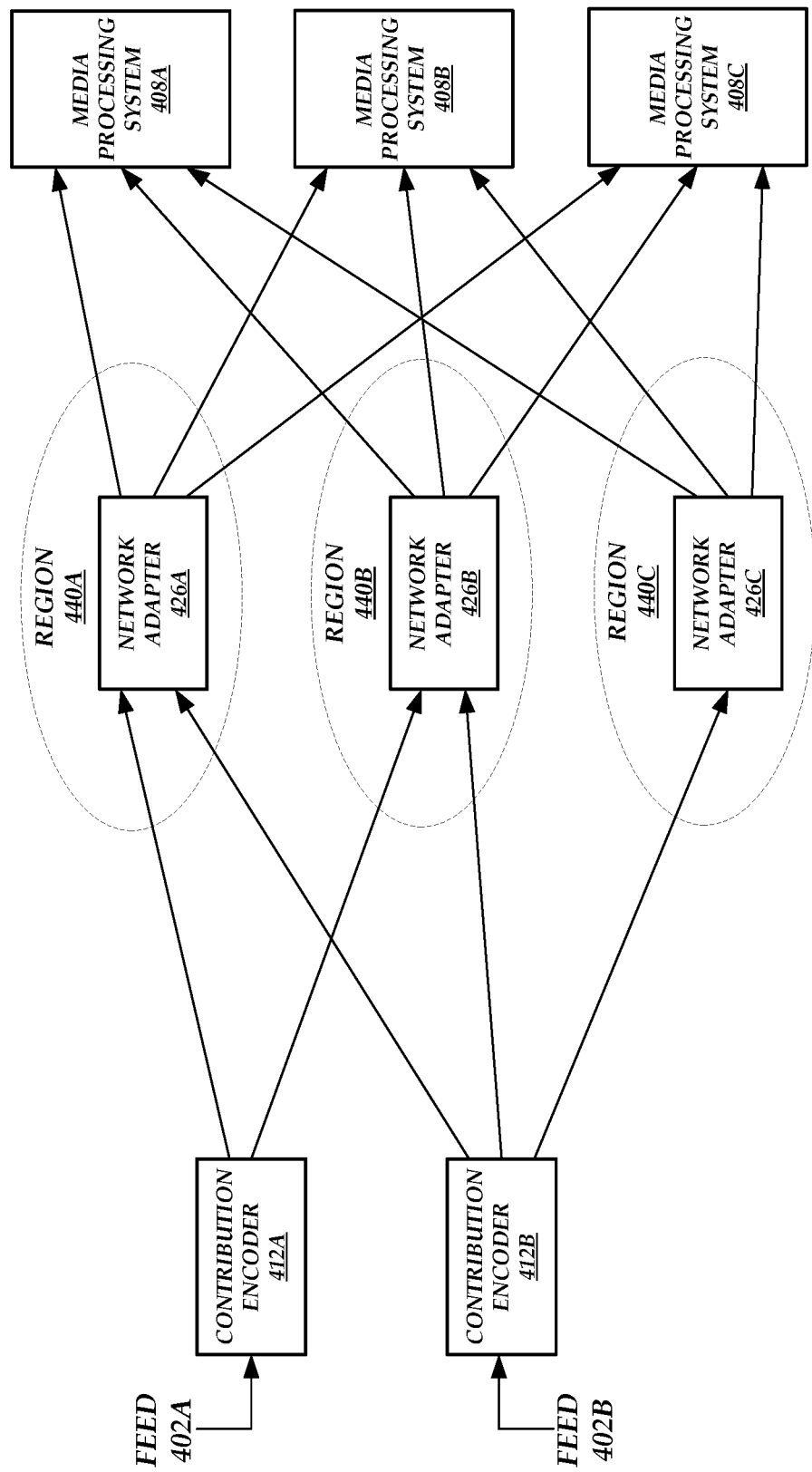
FIG. 4 is a block diagram depicting various contribution encoders, network adapters, and media processing systems in the network-adaptive live media encoding environment of FIG. 1, according to one embodiment.

FIG. 4 is a block diagram depicting various contribution encoders 412A-412B, network adapters 426A-426C, and media processing systems 408A-426C in the network-adaptive live media encoding environment of FIG. 1, according to one embodiment. As illustrated in FIG. 4, each contribution encoder 412A-412B can transmit encoded media to multiple network adapters 426A-426C, each network adapter 426A-426C can receive encoded media from different contribution encoders 412A-412B and can transmit encoded media to multiple media processing systems 408A-408C.

Illustratively, the contribution encoder 412A receives feed 402A from a first source and the contribution encoder 412B receives feed 402B from a second source. Each of the contribution encoders 412A-412B can communicate with one or more network adapters 426A-C. For example, the contribution encoder 412A transmits encoded media to the network adapters 426A-426B and the contribution encoder 412B transmits encoded media to the network adapters 426A-426C.

The network adapters 426A-426C may each function as a primary or secondary network adapter. The network adapters 426A-426C are each located in different regions 440A-440C, respectively. Thus, the contribution encoder 412A, for example, may use the network adapter 426A as a primary network adapter and the network adapter 426B as a secondary network adapter. Alternatively, the contribution encoder 412A can use both network adapters 426A-426B as primary network adapters if, for example, the encoded stream is to be distributed to different regions 440A-440B.

The network adapters 426A-426C can forward encoded media to different media processing systems 408A-408C to, for example, enable the distribution of the encoded media to different end users. Each of the media processing systems 408A-408C may be located in different geographic regions or have differing media processing capabilities.

Figure 5:
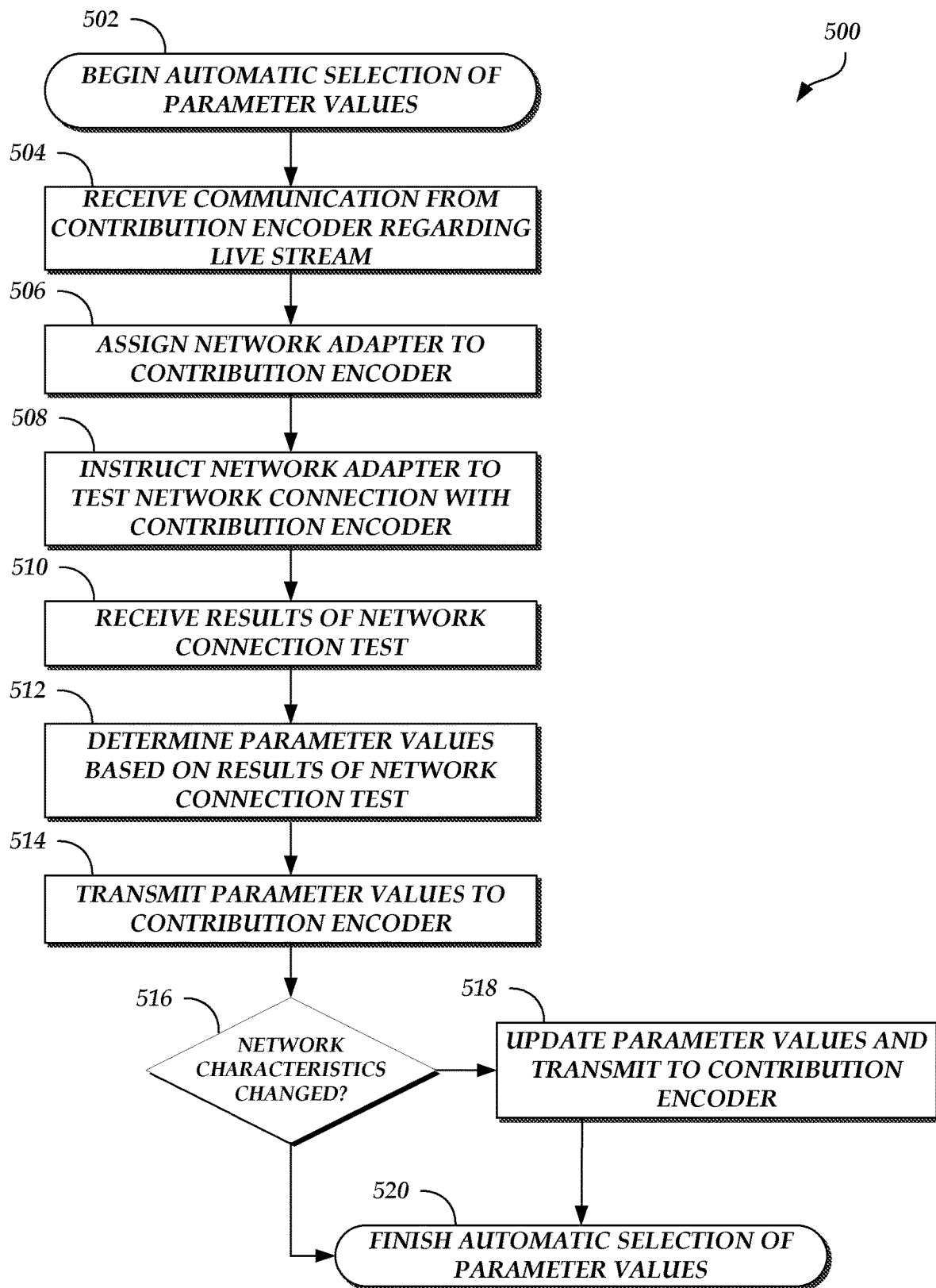
FIG. 5 is a flow diagram depicting an automatic parameter value selection routine illustratively implemented by a network-adaptive encoding system, according to one embodiment.

FIG. 5 is a flow diagram depicting an automatic parameter value selection routine 500 illustratively implemented by a network-adaptive encoding system, according to one embodiment. As an example, the network-adaptive encoding system 106 (e.g., the coordination service system 124) of FIG. 1 can be configured to execute the automatic parameter value selection routine 500. The automatic parameter value selection routine 500 begins at block 502.

At block 504, a communication is received from a contribution encoder regarding a live stream. For example, the contribution encoder may transmit an indication of an intention to transmit a live stream for distribution to end users.

At block 506, a network adapter is assigned to the contribution encoder. The network adapter can be assigned to the contribution encoder because it is in the same geographic region as the network adapter or because of results received from running a traceroute command and other characteristics of the connection between the contribution encoder and the network adapter (e.g., the connection between the contribution encoder and the network adapter has less latency than any other connection between the contribution encoder and a network adapter).

In an embodiment, not shown, optimal parameter values are retrieved from a media processing system. For example, the coordination service system 124 can inform the media processing system 108 that encoded media will be transmitted to the media processing system 108 shortly. The media processing system 108 can then determine optimal parameter values for encoding the media and provide the optimal parameter values to the coordination service system 124 for use in eventually determining parameter values. The optimal parameter values may be determined such that any degradation caused by the media processing system 108 in transcoding the encoded media would not result in the quality of the transcoded encoded media falling below a desired distribution quality level.

At block 508, the network adapter is instructed to test a network connection with the contribution encoder. The test can include sending test packets between the network adapter and the contribution encoder and measuring various network characteristics.

At block 510, results of the network connection test are received. The results can include the measured network characteristics.

At block 512, parameter values are determined based on the results of the network connection test. For example, a rules engine may provide a mapping between the measured network characteristics and appropriate parameter values. In a further embodiment, the parameter values are determined based on the results of the network connection test and the retrieved optimal parameter values. For example, the rules engine may provide a mapping between the measured network characteristics and/or the optimal parameter values and appropriate parameter values.

At block 514, the parameter values are transmitted to the contribution encoder. The contribution encoder can use the parameter values to encode and transmit media. In further embodiments, the network characteristics are continuously monitored and updated parameter values can be determined and transmitted to the contribution encoder if the rules engine so indicates based on current network characteristics.

At block 516, a determination is made as to whether the network characteristics have changed such that updated parameter values are needed. If the network characteristics have changed in this manner, then the automatic parameter value selection routine 500 proceeds to block 518. Otherwise, the automatic parameter value selection routine 500 is complete, as shown in block 520.

At block 518, parameter values are updated and transmitted to the contribution encoder. The updated parameter values can be based on the current network characteristics and/or the optimal parameter values. After the updated parameter values are transmitted to the contribution encoder, automatic parameter value selection routine 500 may be complete, as shown in block 520.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   a source device including a first processor and first memory, wherein the source device transmits a stream of data over a network; and
   a server system including a second processor and second memory, wherein instructions cause the server system to:
   receive a message from the source device that indicates an intention to transmit the stream of data from the source device to the server system;
   initiate and perform a test of a network connection between the server system and the source device prior to transmission of the stream of data from the source device to the server system;
   generate data encoding parameters based on results of the test of the network connection; and
   transmit the data encoding parameters to the source device such that the source device transmits the stream of data using the data encoding parameters.

2. The system of claim 1, wherein the instructions further cause the server system to:
   retrieve updated characteristics of the network connection, wherein the updated characteristics of the network connection are measured as the source device transmits the stream of data to the server system;

generate updated data encoding parameters based on the updated characteristics; and transmit the updated data encoding parameters to the source device such that the source device transmits the stream of data using the updated data encoding parameters.

3. The system of claim 1, wherein the source device transmits the stream of data to at least two separate network adapters of the server system.

4. The system of claim 1, wherein the source device transmits the stream of data to a network adapter of the server system, and wherein a second source device transmits a second stream of data to the network adapter of the server system.

5. The system of claim 1, wherein the data encoding parameters comprise at least one of a codec, a bitrate, an image dimension, chroma subsampling, group of pictures (GOP) length, GOP structure, scan type, a transport type, an audio sampling rate, a video frame rate, or a type of forward error correction.

6. A computer-implemented method comprising:
as implemented by one or more computing devices configured with specific executable instructions,
receiving a message from a source device that indicates an intention to transmit a stream of data from the source device to the one or more computing devices over a network;
initiating and performing a test of a network connection between the one or more computing devices and the source device prior to transmission of the stream of data from the source device to the one or more computing devices;
generating data encoding parameters based on results of the test of the network connection; and
transmitting the data encoding parameters to the source device for use in encoding the stream of data.

7. The computer-implemented method of claim 6, wherein generating data encoding parameters further comprises:
indicating, to a data processing system, that the stream of data will be transmitted;
receiving, from the data processing system, specified data encoding parameters; and
generating the data encoding parameters based on the results of the test of the network connection and the specified data encoding parameters.

8. The computer-implemented method of claim 6, wherein the source device transmits the stream of data to a network adapter of the one or more computing devices selected based on a geographic location of the source device.

9. The computer-implemented method of claim 6 further comprising:
retrieving updated results of an updated network connection test between the one or more computing devices and the source device, wherein the updated network connection test is run as the source device transmits the stream of data to the one or more computing devices;
generating updated data encoding parameters based on the updated results; and
transmitting the updated data encoding parameters to the source device such that the source device uses the updated data encoding parameters in place of the data encoding parameters to encode the stream of data.

10. The computer-implemented method of claim 6, wherein the source device transmits the stream of data to at least two separate network adapters of the one or more computing devices.

11. The computer-implemented method of claim 6, wherein the source device transmits the stream of data to a network adapter of the one or more computing devices, and wherein a second source device transmits a second stream of data to the network adapter of the one or more computing devices.

12. The computer-implemented method of claim 11, wherein the stream of data and the second stream of data correspond to a same live event.

13. The computer-implemented method of claim 11, wherein the data encoding parameters comprise an indication that the stream of data has a first priority level and the second stream of data has a second priority level less than the first priority level.

14. The computer-implemented method of claim 6, wherein the stream of data comprises a statmux of a first stream of data captured from a first location and a second stream of data captured from a second location different than the first location.

15. A non-transitory computer-readable medium having stored thereon executable program code that directs one or more computing devices to perform operations comprising:
initiating and performing a test of a network connection between the one or more computing devices and a source device configured to transmit a plurality of data to the one or more computing devices;
generating a transmission parameter based on results of the test of the network connection; and
transmitting the transmission parameter to the source device for use in transmitting the plurality of data.

16. The non-transitory computer-readable medium of claim 15, wherein the operations further comprise:
indicating, to a data processing system, that the plurality of data will be transmitted;
receiving, from the data processing system, a specified transmission parameter; and
generating the transmission parameter based on the results of the test of the network connection and the specified transmission parameter.

17. The non-transitory computer-readable medium of claim 15, wherein the plurality of data comprises a first plurality of data captured from a first location and a second plurality of data captured from a second location.

18. The non-transitory computer-readable medium of claim 15, wherein the operations further comprise transmitting an updated transmission parameter to the source device based on conditions of the network connection during transmission of the plurality of data.

19. The non-transitory computer-readable medium of claim 15, wherein the source device transmits the plurality of data to at least two separate network adapters of the one or more computing devices.

* * * * *